Oct. 11, 1932.   H. A. HADLEY   1,882,419
EVEN BALANCE SCALE
Filed May 31, 1928
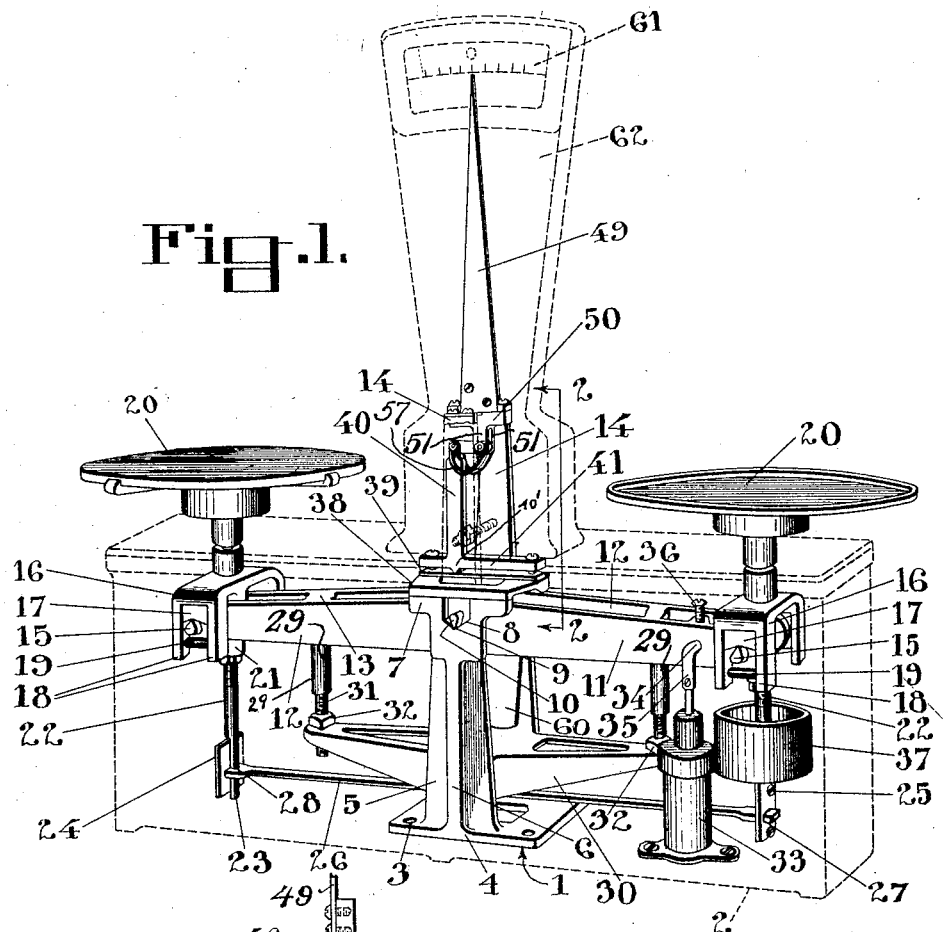
Fig.1.
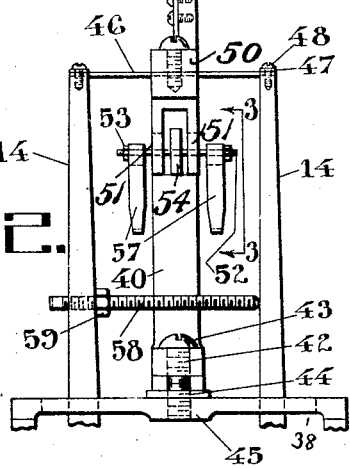
Fig.2.
Fig.3.
INVENTOR
HARLAN A. HADLEY
BY
Henry Sherman
ATTORNEY Patented Oct. 11, 1932

1,882,419

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

EVEN-BALANCE SCALE

Application filed May 31, 1928. Serial No. 281,895.

This invention relates to improvements in scales of that type wherein a pointer is employed to indicate the movement of the beam of an equal-arm balance.

An important object of this invention is the provision in a scale of the character described of an indicator fulcrumed on a torsion ribbon, said indicator being normally yieldingly restrained to a predetermined path.

In a broad aspect, the present invention may be described as providing a means for floatingly mounting the indicator comprising an element adapted to interconnect the indicator and the beam and another element linking the indicator and a stationary part of the scale and adapted to restrain the indicator to a predetermined path with respect to the scale chart, the construction and arrangement being such that a pivotal movement is imparted to the indicator when the beam is actuated during a weighing operation. The advantages of this construction, among others, includes the great multiplication possible and practical from the beam, or even-lever, to the indicator and the simplicity and accessibility of structure.

Another object of this invention is the provision of means for varying the tension of the torsion ribbon on which the indicator is mounted, the construction being preferably an adjusting screw fixed to the beam.

Still another object of the invention is to provide means for taking up the lost motion in the check link connections, such construction eliminating jerky motion of the indicator and causing it to move smoothly over the scale chart.

Still another object of this invention is the provision of a scale structure in which the parts will assume their zero, or neutral, position, though the base of the scale be out of a true horizontal plane.

Other objects of this invention together with certain details of construction and combination of parts, will be more particularly described by reference to the accompanying drawing and pointed out in the appended claims.

In the drawing:

Figure 1 is a perspective elevation view of the scale with one of the upright members of the beam broken away to show the check link connection arrangement, the housing of the scale being shown in broken lines;

Figure 2 is a side view taken on line 2—2 in Figure 1; and

Figure 3 is a detail view of the check link and spring arrangement taken on line 3—3 in Fig. 2.

Similar characters of reference indicate corresponding parts throughout the several views.

Referring to Figure 1 of the drawing, there is shown a scale generally designated by the reference character 1. The scale is mounted in a housing 2 and is fastened to the base thereof by means of screws (not shown) adapted to be seated in screw holes 3 formed in base plate 4 of the scale proper.

Rising from the base plate 4 are a pair of opposed standards 5 having a reinforcing rib 6 extending vertically thereof. The upper extremity of each standard is enlarged to form a boss 7. It is to be understood that the base plate, standards, reinforcing ribs and bosses are integral parts of a single casting. In the bosses 7 are milled openings 8, the lower portions of which are V-shaped to form bearing surfaces 9 for knife-edge 10 mounted in an even-lever, or beam 11. The beam is a casting having parallel side members 12 joined by integral cross-bars 13. Substantially centrally of the side members 12 and integral therewith are formed parallel, opposed upright members 14, the purpose of which will be hereinafter set forth.

In the extremities of the side members 12 are set knife-edge pivots 15 on which are pivotally supported parallels 16. A V-grooved agate 17 is firmly cemented between a pair of fingers 18 of the parallels, the agates being bearing surfaces for the knife-edge pivots 15, as is well understood in the art. For the purpose of retaining the parallels on the pivots, stop pins 19 are driven through suitable apertures in fingers 18.

Suitably mounted on the parallels are the commodity and weight pans 20. The parallels have integral therewith depending stems 21 on which are adjustably mounted the check-posts 22 each having a reduced, flattened portion 23 at the lower extremity thereof to which are attached the check-plates 24 by means of screws 25. A check-link 26 passes through an opening 27 in each check-plate and is retained in position by threading the lower end of the check posts through an eye 28 formed in each extremity of the check link 26.

In order to limit the vertical oscillation of even-lever 11, stop posts 29 are mounted on a shelf 30 formed integral with the base casting. The stop posts are threaded, as at 31, for the purpose of vertical adjustment and are adapted to be locked in adjusted position by means of nuts 32.

A dash-pot 33 is suitably attached to the base of the scale housing in any suitable manner and is adjustable with respect to the scale preferably through the medium of a bent rod 34 which is slidably mounted in an opening 35 in a side member 12 of the even-lever. The bent rod is retained in adjusted position by means of a set screw 36. The dash-pot dampens the movement of the even-lever, as is well understood in the art. A receptacle 37 is attached to one of the check-posts and is adapted to receive molten lead or lead shot for the purpose of balancing the scale elements.

A cap 38 is rigidly seated upon the upper extremities or bosses 7 of the standards and is adapted to close the openings 8 formed therein. Suitably fastened to the cap is a plate 39 on which is mounted a post 40, the lower extremity of the post and integral therewith is formed with a cross-piece 41 having screw-threaded apertures 42 adapted to receive screws 43. It is to be understood that the post is adapted to be angularly adjustable in a vertical plane, being rockable on its wedge-shaped extremity 40'.

The post is adjusted angularly and is adapted to be held in adjusted position by means of screws 43 which enter screw-threaded apertures 44 and 45 in the plate and cap, respectively.

Between the uprights 14 is mounted a torsion ribbon, or strip, 46 and is securely clamped to the uprights by any suitable means, preferably by clips 47 and screws 48. An indicator 49 is fixed to a mounting 50 which is clamped centrally of the ribbon. Depending from the mounting is a bifurcated projection 51 in which a pin 52 is carried, said pin being retained in position by means of nuts 53. Pivotally mounted on the pin 52 is a check-link 54. The check-link is also pivotally mounted on a pin 55 set in the bifurcated tip 56 of the post 40.

The construction above outlined provides a floating fulcrum, the taut length of the ribbon forming a pivotal connection between the indicator and the beam and a fulcrum for the indicator. During a weighing operation, the indicator is also fulcrumed on the pin 52 which cooperates with the post 40 and check-link 54 to form a fixed fulcrum for said indicator whereby the indicator is given a pivotal movement.

The arrangement of the connections of the check-link makes for an appreciable amount of loose play therein which results in lost motion whereby the indicator is given a jerky motion during a weighing operation. To eliminate this, flat springs 57 are mounted on the extremities of the pins 52 and 55, the springs being held on said pins by the nuts and the motion of the indicator is smoothed.

The torsional resistance of the indicator may be varied by means of a screw 58 mounted in one of the uprights 14 and abutting the flat surface of the other upright. A lock-nut 59 retains said screw in adjusted position.

A balance weight 60 is attached to the even-lever 11 substantially centrally thereof for the purpose of controlling the distribution of metal above and below the pivot line of said even-lever.

It may be readily seen that when the housing of the scale is out of true horizontal plane, the even-lever will plumb itself and the indicator will still point to the zero mark on the chart 61 suitably held in the superstructure 62 of the housing.

The path of oscillation of the indicator may be varied by rocking the post 40 on its wedge-shaped tip, the post being held in adjusted position by means of screws 43, as has been stated above.

Having thus described my invention, what I claim as new and desire to secure by Letters Patent of the United States, is:

1. In a device of the character described in combination, a base, a lever pivoted thereon, an indicator fulcrumed on said lever, and means adjustably mounted on said base for restraining said indicator to a predetermined path.

2. In a device of the character described, in combination, a base, a lever pivoted thereon, an indicator fulcrumed on said lever, a check link disposed on said base for restraining said indicator to a predetermined path, and resilient means for taking up lost motion in the check link connections.

3. In a device of the character described, in combination, a base, a lever pivoted thereon, an indicator fulcrumed on said lever, a post adjustably mounted on said base, and a check link having one extremity thereof attached to said post, the opposite end being connected to said indicator.

4. In a device of the character described, in combination, a base, a lever pivoted thereon, a torsion ribbon mounted on said lever, an indicator fulcrumed on said ribbon, a post adjustably mounted on said base, and a check link having one extremity thereof attached to said post, the opposite end being connected to said indicator.

5. In a device of the character described, in combination, a base, a lever pivoted thereon, a torsion ribbon mounted on said lever, an indicator fulcrumed on said ribbon, a post adjustably mounted on said base, and a check link having one extremity thereof attached to said post, the opposite end being connected to said indicator, and means for taking up lost motion in the check link connections.

6. In a device of the character described, in combination, a base, a lever pivoted thereon, a torsion ribbon mounted on said lever, an indicator fulcrumed on said ribbon, a post adjustably mounted on said base, and a check link having one extremity thereof attached to said post, the opposite end being connected to said indicator and spring means for taking up lost motion in the check link connections.

7. In a device of the character described, in combination, a base, a lever pivoted thereon, a torsion ribbon mounted on said lever, an indicator fulcrumed on said ribbon, a post adjustably mounted on said base, said indicator and said post each having a pin set in adjacent extremities, a check link pivotally mounted on said pins, and a spring attached to said pins for taking up lost motion in the check link connections.

8. In a device of the character described, in combination, a base, a lever pivoted thereon, a torsion ribbon mounted on said lever, an indicator fulcrumed on said ribbon, a post adjustably mounted on said base, said indicator and said post each having a pin set in adjacent extremities, a check link pivotally mounted on said pins, and a plurality of springs attached to said pins for taking up lost motion in the check link connections.

9. In a device of the character described, in combination, a base, a lever pivoted thereon, a torsion ribbon mounted on said lever, an indicator fulcrumed on said ribbon, said indicator having a bifurcated extremity, a check link having one end pivoted in said bifurcation, and a post on which the opposite end of said check link is pivoted.

10. In a device of the character described, in combination, a base, a lever pivoted thereon, a torsion ribbon mounted on said lever, an indicator fulcrumed on said torsion ribbon, an angularly adjustable post mounted on said base, and a check link connecting said post and said indicator.

11. In a device of the character described, in combination, a base, a lever pivoted thereon, a torsion ribbon mounted on said lever, an indicator fulcrumed on said torsion ribbon and connected to said base, and means for varying the tension of said ribbon.

12. In a device of the character described, in combination, a base, a lever pivoted thereon, a torsion ribbon mounted on said lever, an indicator fulcrumed on said torsion ribbon and connected to said base, and means for varying the tension of said ribbon comprising a screw mounted in said lever.

13. In a device of the character described, in combination, a base, a lever pivoted thereon, said lever having upright members integral therewith, a torsion ribbon mounted between said members, an indicator fulcrumed on said torsion ribbon and connected to said base, and means for varying the tension of said ribbon comprising a screw mounted in one of said upright members.

14. In a device of the character described, in combination, a base, a lever pivoted thereon, said lever having a pair of parallel upright members integral therewith, a torsion ribbon mounted on said members, an indicator fulcrumed on said torsion ribbon and connected to said base, and means for varying the tension of said ribbon comprising a screw mounted in one of said upright members and adapted to abut against the other of said upright members.

15. In a device of the character described, in combination, a base, a lever pivoted thereon, an indicator fulcrumed on the said lever, a check link having one end mounted on support means carried by said base, and the other end connected to the said indicator, and resilient means for taking up the lost motion in the check link connections and thereby steadying the movement of the indicator.

16. In a device of the character described, in combination, a base, a lever pivoted thereon, an indicator fulcrumed on the said lever, a check link having one end pivotally mounted on support means carried by said base, and the other end pivotally connected to the said indicator, and resilient means for taking up the lost motion in the check link connections and thereby steadying the movement of the indicator.

17. In a device of the character described, in combination, a base, a lever pivoted thereon, an indicator fulcrumed on the said lever, a check link having one end mounted on support means carried by said base, and the other end connected to the said indicator, and resilient means operatively connected to the said support means and to the indicator for taking up the lost motion in the check link connections and thereby steadying the movement of the indicator.

18. In a device of the character described, in combination, a base, a lever pivoted thereon, an indicator fulcrumed on the said lever, a check link having one end pivotally mounted on support means carried by said base, and the other end pivotally connected to the said indicator, and resilient means connected to the said support means pivot and to the indicator pivot, for taking up the lost motion in the check link connections and thereby steadying the movement of the indicator.

19. In a device of the character described, in combination, a base, a lever pivoted thereon, an indicator fulcrumed on the said lever, a check link having one end pivotally mounted on support means carried by said base, and the other end pivotally connected to the said indicator, and resilient means fixedly secured to the pivot of the said support means and to the indicator pivot, for taking up the lost motion in the check link connections and thereby steadying the movement of the indicator.

20. In a device of the character described, in combination, a base, a lever pivoted thereon, an indicator fulcrumed on the said lever, a support pivotally mounted on the said base and carrying a check link pivoted to the said support and to the indicator, and means for adjusting the said support whereby the path of oscillation of the indicator may be varied.

21. In a device of the character described, in combination, a base, a lever pivoted thereon, an indicator fulcrumed on the said lever, a support pivotally mounted on the said base and carrying a check link pivoted to the said support and to the indicator, and angularly adjustable means carried by the said support and co-operating with the base, adapted to vary the path of oscillation of the indicator.

In testimony whereof I hereunto affix my signature this 29th day of May, 1928.

HARLAN A. HADLEY.